United States Patent [19]

Shell

[11] 3,794,282

[45] Feb. 26, 1974

[54] COUPLING ASSEMBLY

[76] Inventor: Irving W. Shell, 442 W. Wellington, Chicago, Ill. 60657

[22] Filed: May 17, 1972

[21] Appl. No.: 254,289

[52] U.S. Cl. .............................................. 248/244
[51] Int. Cl. ........................................... A47g 29/02
[58] Field of Search.................... 248/243, 244, 245

[56] References Cited
UNITED STATES PATENTS

| | | | |
|---|---|---|---|
| 2,928,512 | 3/1960 | Slater et al...................... | 248/243 X |
| 2,682,322 | 6/1954 | Bloedow....................... | 287/189.36 F |
| 3,143,981 | 8/1964 | Tassell.......................... | 248/243 UX |

*Primary Examiner*—William H. Schultz
*Attorney, Agent, or Firm*—Richard R. Mybeck

[57] ABSTRACT

A coupling assembly comprising in combination a support standard having a channel defined therein having opposing faces on the sides thereof, each of the faces of the channel have longitudinally extending grooves defined thereupon on either side of a pocket portion disposed therewithin; an intermediate member or connector means attachable to an article to be supported thereby and having an opening defined therethrough which extends axially of the supported article; and a bolt which extends through said opening in said intermediate member into said channel in said support standard and obtains locking engagement within said channel whereupon said standard, said intermediate member and said bolt are integrally joined to support said article. The locking engagement is obtained either by the coaction of the grooves with a threaded bolt or by the coaction of the pockets with a special end portion of a bolt.

3 Claims, 10 Drawing Figures

COUPLING ASSEMBLY

DESCRIPTION OF INVENTION

This invention relates generally to coupling systems for shelving and partitions and more particularly to a novel system of connecting members such as shelves, partitions and the like with specially designed free standing or wall mounted uprights whereupon desired assemblies are quickly and easily created with a minimum of labor and none of the tedium of alignment inherent in many of the prior art structures.

Means for connecting a variety of members to each other to create an assembly of predetermined shape and size such as book shelves, room partitions and the like, are broadly old in the art but as will appear, none have obtained all of the many advantages available from the assembly of the present invention which further substantially eliminates all of the problems and annoyances which have inherently accompanied the prior art devices.

Representative prior art devices are described in U.S. Pat. Nos. 2,674,431, Apr. 6, 1954, Attwood; 2,696,139, Dec. 7, 1954, Attwood; Re. 24,133, Mar. 20, 1966 Bloedow; 3,139,960, July 7, 1964 Hammitt et al.; and 3,564,666, Feb. 23, 1971, Dold.

A consideration of each of the prior art disclosures will clearly reveal that while certain needs were indeed fulfilled by each of the structures they define, major problems remained unsatisfied. It is to the solution of those problems that the present invention is directed.

Accordingly, it is a principal object of the present invention to provide new and improved means for connecting members such as shelf brackets, partitions and the like with specially designed free standing or wall mounted uprights in a manner which permits desired assemblies to be quickly and easily created with a minimum of labor and none of the tedium of alighment heretofore inherent in such structures.

Another object of the present invention is to provide a coupling system for shelf brackets, partitions and the like which eliminates the need to align the slots in a plurality of uprights while obtaining a structure which is quickly, easily and accurately leveled.

Still a further object of the present invention is to provide a new and improved coupling system especially suited for mounting level shelving to vertically disposed standards irrespective of the condition of level of the floors and walls in the room where such system is used.

Still another object of the present invention is to provide a system for connecting bracket supported shelves to upstanding standards wherein any degree of tilt may be provided such shelf without materially altering the assembly used.

A still further object of the present invention is to provide a new and improved coupling system which employs a unique upright standard having a plurality of grooves disposed within a central channel defined in the standard, a threaded bolt, and a connector member readily attachable to any conventional shelf bracket or partition and coactable with said channel and said bolt to readily secure said shelf bracket or partition relative to said standard.

Another object of the present invention is to provide a new and improved coupling system in which a specially designed standard is provided with optional locking emans comprising a central channel having a plurality of axially extending grooves defined therein on opposed faces thereof, the grooves on each face being disposed in two groups contiguous with an intermediate pocket disposed in substantial registry with the corresponding pocket of the other face, said grooves coacting with a threaded bolt and said pockets coacting with a turn bolt to provide locking means to secure a connector member to the standard.

These and still other objects as shall hereinafter appear are readily fulfilled by the present invention in a remarkably unexpected fashion as shall be readily discerned from a careful consideration of the following detailed description of exemplary embodiments of my invention, especially when read in conjunction with the accompanying drawing wherein like reference numerals identify similar parts throughout the several views and in which.

Figure 1:
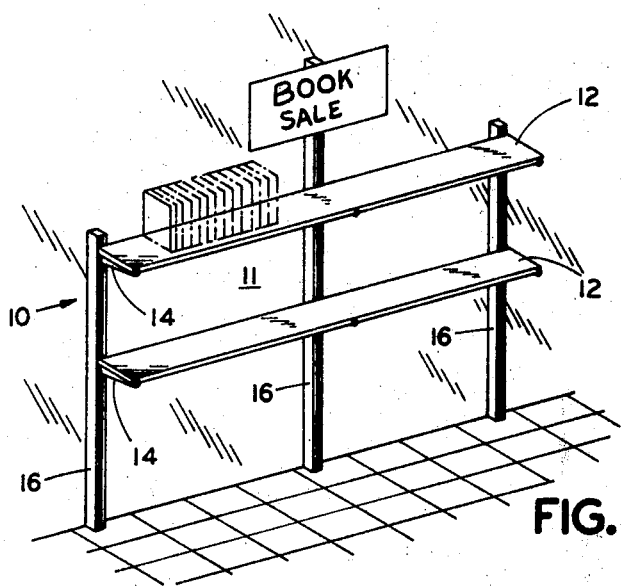
FIG. 1 is an isometric view of a book shelf embodying the assembly of the present invention.

Referring to FIG. 1 of the drawing, one embodiment of the novel connecting assembly of the present invention, identified by the general reference numeral 10, is shown in the highly useful setting to mount a plurality of book shelves 12 resting on brackets 14 which extend outwardly from standards 16.

Figure 3:
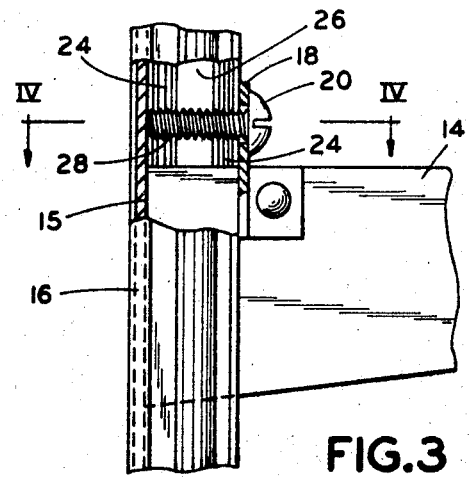
FIG. 3 is fragmentary side elevations, partially in section, showing a connecting assembly embodying the present invention.
Figures 2, 4, 10:
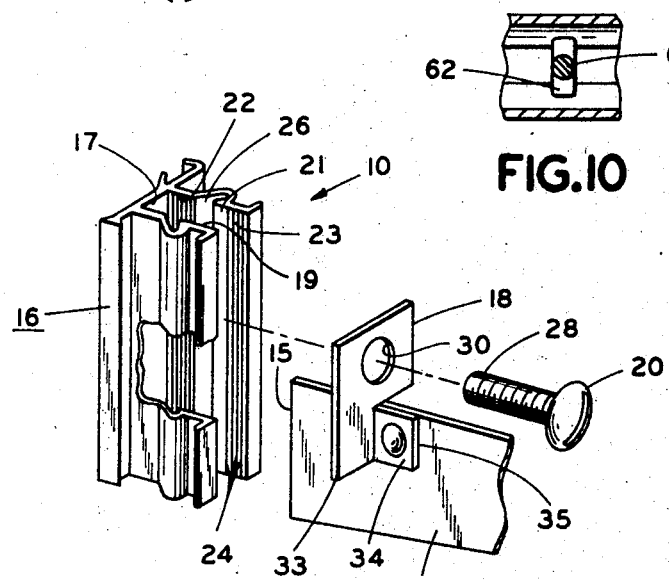
FIG. 2 is an exploded showing, partially broken away, of an assembly embodying the present invention.
FIG. 4 is a cross-section taken along line IV—IV of FIG. 3.
FIG. 10 is a section taken along line X—X of FIG. 6.

As shown in FIGS. 2-4, each assembly 10 is created by the coaction of standard 16 with a connector means 18 and a bolt 20.

In a preferred embodiment of my invention, standard 16 has a central channel 17 defined therewithin which channel is provided with opposing faces 19, 21 each having an inner portion 22 and an outer portion 23 upon which a plurality of longitudinally extending substantially parallel grooves 24 are defined. Portions 22 and 23 are separated by intermediate portion 26 herein called a "pocket" upon which no grooves are defined.

The space between opposite portions 22 of faces 19, 21 is defined to receive and hold securely therewithin the threaded portion 28 of bolt 20 which, in assembly, passes through the opening 30 defined in connector means 18 to complete the assembly.

Connector means 18 is connectable, in a manner to be hereinafter described in detail, to shelf support brackets (shown as 14 in FIGS. 1-3) or to a convenient partition (shown at 32 in FIGS. 5-7-9).

When the structural member being secured by the assembly is of a metallic origin, intermediate member that is, connector means 18 can be quickly and easily fastened thereto as by welding, soldering or brazing. For example, as shown in FIG. 2, connector means 18 is formed as a rectangular member having opening 30 defined in the upper half thereof and having a lower half comprising a depending portion 33 and a flange portion 34, the flange portion 34 being disposed generally normal to the depending portion 33 and presenting a flat surface 35 which can be readily fused to the fusible bracket 14. Suitable mechanical fasteners such as a rivet can also be employed when desired.

Figure 5:
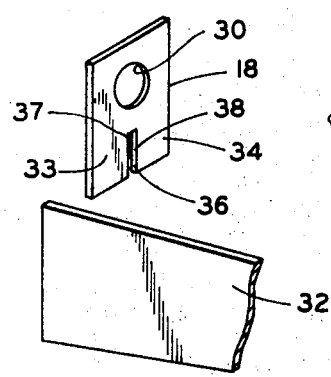
FIG. 5 is an exploded view showing the relationship between one connector member of the assembly and a partition.

Alternatively, connector means 18 can be formed as shown in FIG. 5 wherein depending portion 33 and flange portion 34 are coplanar and separated by a slot 36 having a width adequate to receive the thickness of the fusible partition 32. In this arrangement, the connector means 18 is bonded to the partition 32 along the inner edges 37, 38 of portions 33, 34 respectively.

Figure 7:
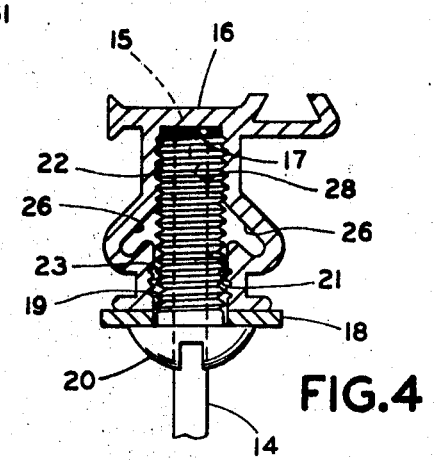
FIG. 7 is an exploded isometric view of an alternate connector means embodying the present invention.
Figures 8, 9:
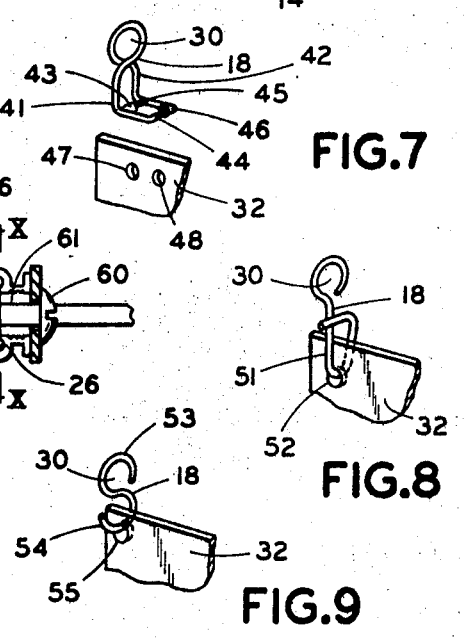
FIG. 8 is an isometric view of still another connector means embodying the present invention.
FIG. 9 is an isometric view of still another connector means embodying the present invention.

When the structural member to be so joined to connector means 18 is non-metallic such as plaster board, wood and the like, the intermediate member 18 is suitably secured to the supported member e.g., partition 32 by any such means as are represented by FIGS. 7-9.

For instance, as shown in FIG. 7, connector means 18 can be formed having an upper loop defining opening 30 and two depending L-shaped arms 41, 42. Each arm, for example, arm 41, in the base of the L is provided with a first and a second portion cooperative with the corresponding portion on the other arm 42 to provide a connector. Thus arm 41 can be provided with female couplers 43, 44 and arm 42 can be provided with male couplers 45, 46 which when forced into coupler 43, 44 will snap into place. When this embodiment is used, a first and second opening 47, 48 is drilled or otherwise defined in partition 32 and one coupler set, e.g., 43-45, operates through opening 47 and the other, e.g., 44-46, operate through opening 48 whereupon connector means 18 is secured to the supported member 32.

Another connector means 18 useful in the practice of the present invention when non-fusible partitions 32 or brackets 14 are to be supported is shown in FIG. 8. Here the connector means 18 comprises a single strand of suitable material such as metal formed to have an upper loop which defines opening 30 and a depending loop 51 which passes through a single opening 52 defined in the partition 32 to hold the partition relative to opening 30.

A further connector means 18 found useful in certain installations is provided by the S shaped member illustrated in FIG. 9 which provides both the opening 30 with the upper curve 53 of the S and the member engaging means with the lower curve 54 of the S by passing curve 54 through the opening 55 defined through partition 32.

The locking relationship in my assembly can be obtained by utilizing one of two systems which I have designed in and for my standard. Thus, as shown in FIGS. 1-4, the threaded portion 28 of bolt 20 lockingly engages the grooves 24 defined in the central channel 17 of standard 16 to secure connector means 18 to the standard and hold the supported member in place.

Figure 6:
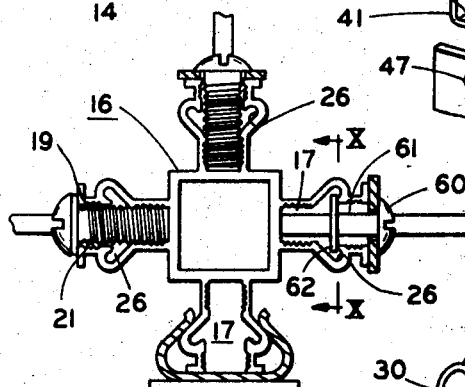
FIG. 6 is a plan view of a vertical standard of multidirectional extenders showing an alternate embodiment of the present invention.

A variant, shown in FIG. 6, employs a non-threaded bolt 60 having a short shank portion 61 and an elongated end portion 62 extending transversely of said shank portion 61. End portion 62 is provided with a width which is narrower than the space between portions 23 and a length which is substantially greater so that when end portion 62 is disposed parallel to faces 19, 21 and inserted into channel 17, it can be rotated approximately 90° to lock the respective tips of end portion 62 in each of the pockets 26, 26. In this manner, a connector means 18, disposed on shank 61 by passing end portion 62 through opening 30, is firmly secured to bracket 16 as is the member, such as partition 32, which is supported thereby.

A description of an exemplary installation using bookshelves as representative and employing my invention will now be presented to assist in the understanding of its function and to enhance the appreciation of its many advantages and conveniences.

To assemble the representative structure, such as the bookshelves shown in FIG. 1, a plurality of standards 16 manufactured in accordance with my description are bolted to the selected supporting surface such as the wall illustrated at 11.

With the present invention, it is no longer essential for utility to exactly align each of the standards 16 to assure that each (1) is exactly parallel with every other and (2) that each of the slots disposed therein are in horizontal alignment with the corresponding slots of each other standard. Instead, the standards of this invention are just mounted, quickly and easily, in any suitable fashion as with wood screws, molly fasteners, nails and the like.

Next, any conventional shelving bracket 14 is obtained and to it is secured intermediate member 18 as by spot welding or the like. With flange 35 secured to the side of the bracket 14 in spaced relationship to that end 15 of the bracket which, as will appear, is insertable within channel 17, the supported member or bracket 14 and connector means 18 form a unit.

When each bracket 14, having a connector means 18 suitably attached as described, bracket end 15 is inserted into channel 17 and a suitable bolt 20 having a diameter slightly smaller than the space defined by portions 23 and slightly larger than the space defined by portions 22 is passed through opening 30 and into channel 17 and turned so that the threads 28 of bolt 20 engage the grooves 24 defined on portions 22 of channel faces 20, 21 until intermediate member 18 tightly engages standard 16 in abutting relationship thereto.

The same procedure is followed with respect to each of the other brackets 14 employed to support a shelf 12 and only in the installation of these subsequent brackets is care required to level the shelf and then only to the extent that each bracket 14 should be horizontally aligned with the corresponding bracket assembly on the adjacent standard. It should be noted, however, the alignment obtained can occur on any segment of the entire height of the upright standard.

The foregoing porcedure is followed as many times as may be needed to provide the desired number of shelves of whatever length is wanted.

When the supported member is a partition 32 which is fusible, that is, is capable of being spot welded with or riveted to connector means 18, the aforedescribed procedure of securing the partition-connector means sub-assembly to the bracket can be followed by passing bolt 20 through opening 30 and engaging grooves 24 with bolt threads 28.

If the supported member is a non-fusible partition 32, then alternative connector means 18 as shown in FIGS. 7-9 may be employed. It is of course understood that these connector means 18 can also be used with fusible partitions when the circumstances warrant.

To use the non-fused connector means 18, a suitable opening, such as opening 52 in FIG. 8 or 55 in FIG. 9, or openings 47,48 in FIG. 7, are drilled into partition 32 at the appropriate location and the connector means 18 are attached thereto in the following manner.

As shown in FIG. 7, couplers 43,44 are respectively engaged by couplers 45,46 passing through openings 47, 48 and the sub-assembly is secured to standard 16 in the manner already described wherein bolt 20 passes through opening 30 and is threadly engaged by grooves 24.

Similarly, as shown in FIG. 8, lower loop 51 is guided through opening 52 and the sub-assembly secured to the standard 16 by passing bolt 20 through opening 30 in the manner described.

With the embodiment of FIG. 9, the lower curve 54 of connector means 18 is passed through opening 55 of partition 32 and the resulting sub-assembly is secured to the standard by passing bolt 20 through opening 30 to engage grooves 24 with threads 28.

In still another embodiment of my invention, each of the various connector means - supported member sub-assemblies can be satisfactorily attached to standard 16 by using a non-threaded bolt 60 having a short shank portion 61 and an elongated end portion 62 extending transversely of shank portion 61 as shown in FIG. 6. The end portion 62 is aligned with pockets 26 on either side thereof whereupon bolt 60 is rotated approximately 90° and the tips of end portion 62 enter one of said pockets 26 to secure the sub-assembly to the standard 16.

From the foregoing it becomes apparent that the bracket, intermediate member and bolt cooperate to define an assembly which can readily be employed to easily and quickly install any type of commercially available shelves and brackets with a substantial reduction in the time and effort required to complete the job.

It is of course understood that while the invention is illustrated with respect to wall mounted standards, it is likewise readily employed with free standing standards, suspended standards or any other standard which can be maintained in a relatively stationary position.

The assemblage is also well adapted for use with free standing standards or uprights which are set in a weighted base member (not shown) to create modular office and room partitions. When a standard such as shown in FIG. 6 is used, a plurality of partitions can be mounted to a single support standard to create a plurality of walls. Of course, while a four directional standard is shown, a two and three directional standard can also be used employing the linkage described in my previous U.S. Pat. No. 3,555,715 which issued Jan. 19, 1971.

From the foregoing, it becomes apparent that a new and improved coupling assembly has been herein described and illustrated which fulfills all of the aforestated objectives in a remarkably unexpected fashion. It is, of course, understood that such alterations, modifications and adaptations as may readily occur to the artisan when confronted with this disclosure are intended to be embraced within the spirit of the present invention which is limited only by the scope of the claims appended hereto.

What is claimed is:

1. A coupling assembly comprising in combination a support standard having a channel defined therein having opposing faces on the sides thereof, each of said faces having longitudinally extending grooves defined thereupon and a pocket portion disposed therewithin; an intermediate member attachable to an article to be supported thereby and having an opening defined therethrough extending axially of said article, said intermediate member comprising a plate having an upper portion and a lower portion, said upper portion having said opening defined therein, said lower portion being slotted to receive said supported article therewithin; and a bolt extending through said opening in said intermediate member into said channel in said support standard for locking engagement within said channel whereupon said standard, said intermediate member and said bolt are integrally joined to support said article.

2. A coupling assembly according to claim 1 in which said bolt has a threaded shank for locking engagement within said grooves in said channel.

3. A coupling assembly according to claim 1 in which said bolt has shank portion and and elongated end portion which in a first position is insertable in said channel and which when rotated about 90° to a second position enters into said pocket portions for locking engagement therewith.

* * * * *